INVENTORS
JAMES EDWARD PRADER
HARLESS W. KING II
Anderson, Luedeka, Fitch, Even & Tabin
ATTYS.

INVENTORS
JAMES EDWARD PRADER
HARLESS W. KING II

Anderson, Luedeka, Fitch, Even, & Tabin
ATTYS.

Sept. 26, 1972 J. E. PRADER ET AL 3,694,293

APPARATUS FOR SPLICING ENDS OF MAGNETIC TAPE OF A CARTRIDGE WITH A METALLIC SPLICE

Filed Sept. 28, 1970 4 Sheets-Sheet 3

INVENTORS
JAMES EDWARD PRADER
HARLESS W. KING II

Anderson, Luedeka, Fitch, Even & Tabin
ATTYS.

INVENTORS
JAMES EDWARD PRADER
HARLESS W. KING II

Anderson, Luedeka, Fitch, Even & Tabin
ATTYS.

United States Patent Office

3,694,293

Patented Sept. 26, 1972

3,694,293

APPARATUS FOR SPLICING ENDS OF MAGNETIC TAPE OF A CARTRIDGE WITH A METALLIC SPLICE

James Edward Prader, Roselle, and Harless W. King II, Itasca, Ill., assignors to Ampex Corporation, Redwood City, Calif.

Filed Sept. 28, 1970, Ser. No. 75,810
Int. Cl. B31f *5/00;* G03d *15/04;* B32b *7/04*
U.S. Cl. 156—506 11 Claims

ABSTRACT OF THE DISCLOSURE

An assembly line device and method are provided for splicing ends of a magnetic tape together by an adhesive bearing splice which is automatically severed from a web transferred to the aligned tape ends and pressed thereagainst. The splice web preferably has a pressure sensitive adhesive on one side thereof covered by a backing strip which is peeled therefrom and wound on a take-up spool. In response to operation of a switch means, a motor means causes the automatic feeding of the splicing web, severing of the splice and adhering of the splice to the tape ends thereby providing a fast and inexpensive splicing operation.

This invention relates to a method of and an apparatus for splicing together ends of a strip material and more particularly to splicing together ends of magnetic tape with an adhesive bearing splicing tape.

The method and apparatus of this invention are described hereinafter in connection with the splicing together of ends of a coil of magnetic tape to form an endless loop such as used in a tape cartridge for playback or recording. The ends of the magnetic tape are spliced together with a metallic foil splice which serves not only to join the ends of the tape to form the endless loop of tape but also to provide a metallic sensing element which may be sensed to locate the splice which indicates that the tape has been played through one entire loop.

Magnetic tape cartridges of this kind are mass produced in large quantities where reductions in the labor cost used in splicing the tape and reduction in the cost of materials used to make the splice may result in considerable savings because of the large number of units produced. Heretofore, the ends of the magnetic tape have been joined with preformed metallic splices which are mounted on a backing sheet and peeled therefrom by the operator. A removable protective strip is provided on the outer side of each splice. When forming a splice, the operator places a tape cartridge having a spool of tape therein on a support table with the ends of the tape available for splicing. The operator will place the ends of the tape in a jig and take a preformed metallic splice and press the adhesive coating against the tape ends. The operator then strips the protective strip from the metallic splice. Such preformed metallic splices are relatively expensive and the time and motions required of the operator to place and adhere the metallic strips to form the splice results in a considerable cost per splice.

In addition to being time consuming and to requiring an expensive preformed splice, this manual operation is subject to operator error. For example, the magnetic tape is very thin and limp and the ends thereof are easily displaced from alignment one with the other by the operator when positioning the preformed splice on the magnetic tape ends. Also, the manual pressure exerted by the operator may sometimes be insufficient to obtain proper adhesion between the splice and the tape ends.

Accordingly, a general object of the invention is to provide an improved and more efficient manner of splicing ends of strip material together, particularly to splicing together thin magnetic tape ends to provide an endless tape for a magnetic tape cartridge.

These and other objects and advantages of the invention will become apparent from the following detailed description taken in connection with the accompanying drawings in which.

Figure 2:
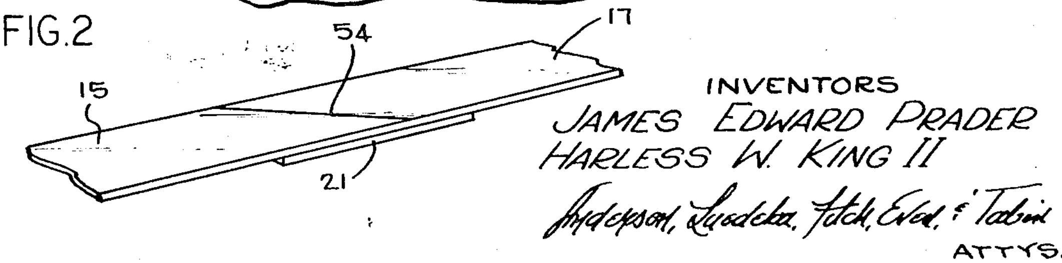
FIG. 2 is an enlarged, fragmentary view of a splice joining the ends of the tape together.

As shown in the drawings for purposes of illustration, the invention is embodied in an apparatus 11 which, very generally, comprises a substantially horizontal support 12 at an operator's station for supporting a magnetic tape cartridge 13 from which projects ends 15 and 17 of a coiled magnetic tape 19 disposed within the cartridge. The tape ends 15 and 17 are aligned and positioned adjacent each other by the operator to receive a splice 21 (FIG. 2). More specifically, the operator places the cartridge 13 on the support 12 and places the tape ends 15 and 17 in alignment at a splicing station with the aid of a locating means such as a groove 26 in the support. The operator then actuates a switch means 29 which automatically causes a splice 21 to be severed from a web 31 (FIG. 7) of splicing material and then the splice 21 is automatically carried to and pressed against the lower side of the tape ends 15 and 17, as best seen in FIG. 6.

Preferably, a resilient, compressible backing means 33 is positioned over and against the upper side of the tape ends 15 and 17 to resist the upwardly directed force of the splice 21 which is carried upwardly on the top of a punch and applicator member 34 which serves the multiple functions of severing the splice, transferring the splice from the place of severance and applying the same to the tape ends. By regulating the stroke of the punch and applicator member 34 and the use of the compressible backing member, a consistent and uniform pressure across the entire splice is obtained to assure permanent adhesion to both of the tape ends thereby eliminating the need to roll a member across the splice to assure good adhesion. Also, as will be explained in greater detail, the tape ends 15 and 17 are also held in position against shifting or misalignment by the locating means 25 and a vacuum means 35, which appiles suction to the underside of the tape ends to hold the same against the support 12 while the operator swings the backing means 33 over and into contact with the tape ends.

Figure 6:
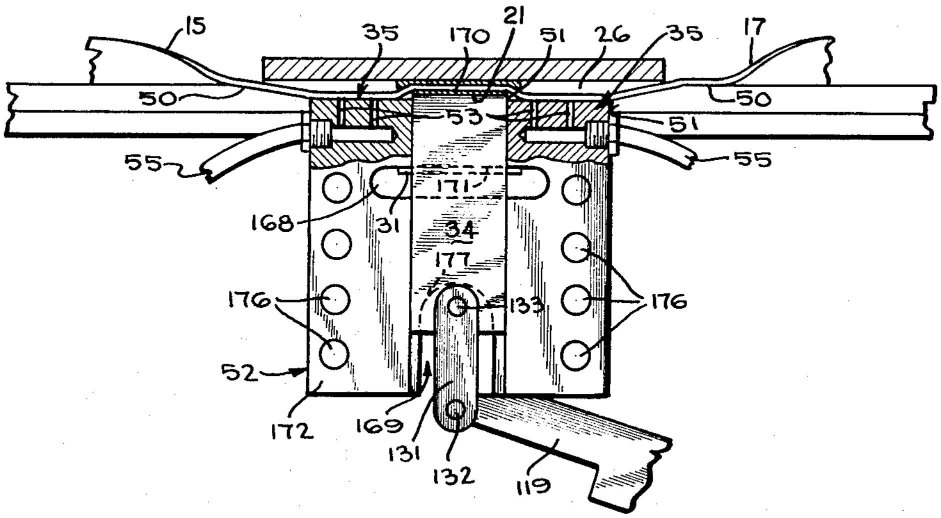
FIG. 6 is an enlarged partially sectional view taken substantially along the line 6—6 of FIG. 3.
Figure 7:
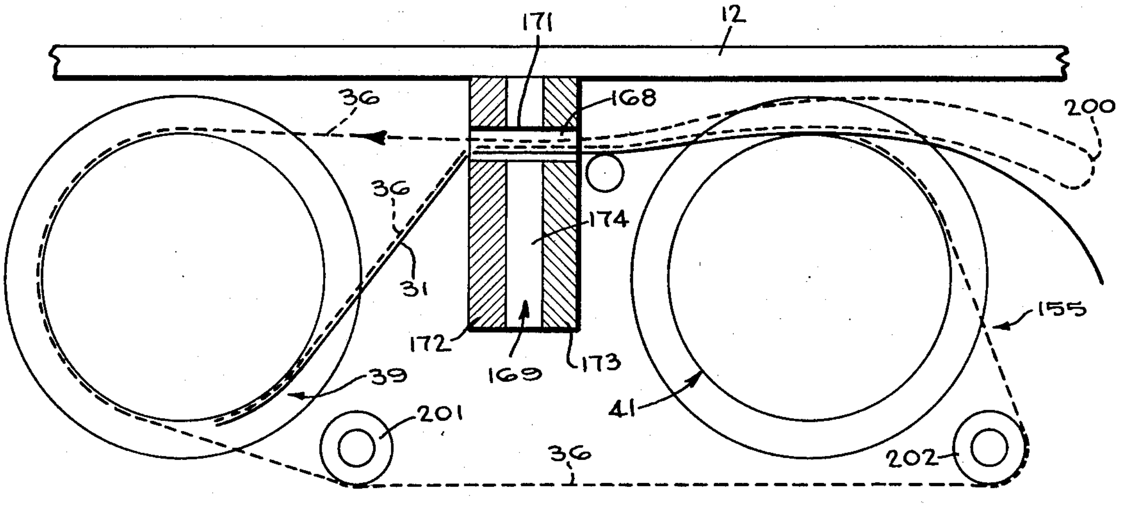
FIG. 7 is a diagrammatic view of the splice web and a backing strip threaded and extended between a supply and a take-up spool.
Figure 8:
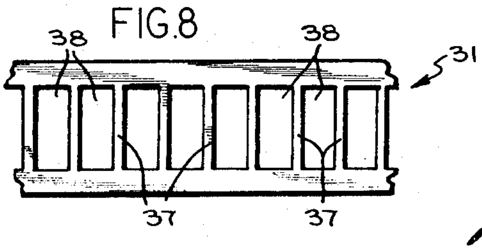
FIG. 8 is a plan view of a splicing web from which splices have been severed.

The preferred web 31 of splice material has a pressure sensitive adhesive coating on its upper side, when viewed as in FIGS. 6 and 7 which is protected by a backing web or strip 36 (FIG. 7) which is peeled from the adhesive coating just prior to a splice severing station at which the splice is severed from the web 31. As the web 31 leaves the splice severing station, it has a ladder-like appearance as a result of the openings 38 formed by removal of a splice and thin strips 37 (FIG. 8) between adjacent openings. The preferred web 31 and backing strip are provided in a wound supply roll 39 (FIG. 7) and are separated after being unwound from the supply roll with the web 31 moving through the splice severing station to a take-up roll 41 on which is also wound the backing strip.

Considerable economies in the cost of the splice 21 are obtained by severing the splices 21 from the web 31 in contrast to using individual preformed splices each of which had an individual peelable strip and were fastened to a card. Also, the automatic application of the splice to the tape ends is a much faster operation than in the prior art operation, in which the operator removed preformed splices from a card, applied the splice to the tape and then peeled the protective cover from the splice.

Additionally, the preferred apparatus is advantageously carried on the support 12 with most of the operating means to feed the splice web and to cut the splices 21 fastened to the underside of the support. As will be explained, the preferred manner of operation uses pneumatic controls and motors which can be easily connected to or disconnected from pneumatic supply lines. Also, the unit may be quickly removed and another substituted therefor in an assembly line bench all in a matter of minutes for convenience in servicing or maintenance.

The illustrated apparatus 11 will now be described in greater detail. The support 12 is in the form of a flat table on the upper surface of which the cartridge 13 may be placed and manipulated. The cartridge is brought into position by the operator and pushed against front and side edges 47 and 49 of locators or guides 51 projecting upwardly from and fastened to the top of the table. Formed in the support 12 adjacent the cartridge guides 51 is the tape receiving slot or groove 26 which is slightly wider in width than the tape width. As best seen in FIG. 6, the slot 26 has downwardly inclined bottom walls 50 leading to an opening 51 in the table at which is located a die block 52 and the punch and applicator member 34 which moves through the die block 52 and the opening 51 in the table to press the splice against the underside of the tape ends.

The slot 26 helps the operator align the tape ends when the operator pushes the tape ends 17 and 19 into the slot. The preferred tape ends are formed with beveled edges, i.e. at an angle to the transverse and longitudinal dimensions of the tape. The beveled edges are slid toward each other and are preferably abutted at a juncture line 54 formed by their abutted beveled edges. The tape ends are held against shifting when released by the operator due to suction forces applied to the underside of the tape ends. For this purpose, a series of small passageways 53 (FIG. 6) are provided in the punch block 52 with the upper ends of the openings 53 covered by the tape ends. The lower ends of the passageways are connected by a vacuum line 55 to a main vacuum inlet 57 carried on a support block 59 fastened to the underside of the support 12. The vacuum inlet 57 is in fluid communication with releasable disconnect sleeve 61 which is connected to a conduit 63 connected to a vacuum pump (not shown). Thus, below atmospheric pressure is applied through conduit 63 and vacuum line 55 and through passageways 53 to the underside of the tape ends 15 and 17 to hold the tape ends flat against twisting or shifting when they are released by the operator.

Figure 1:
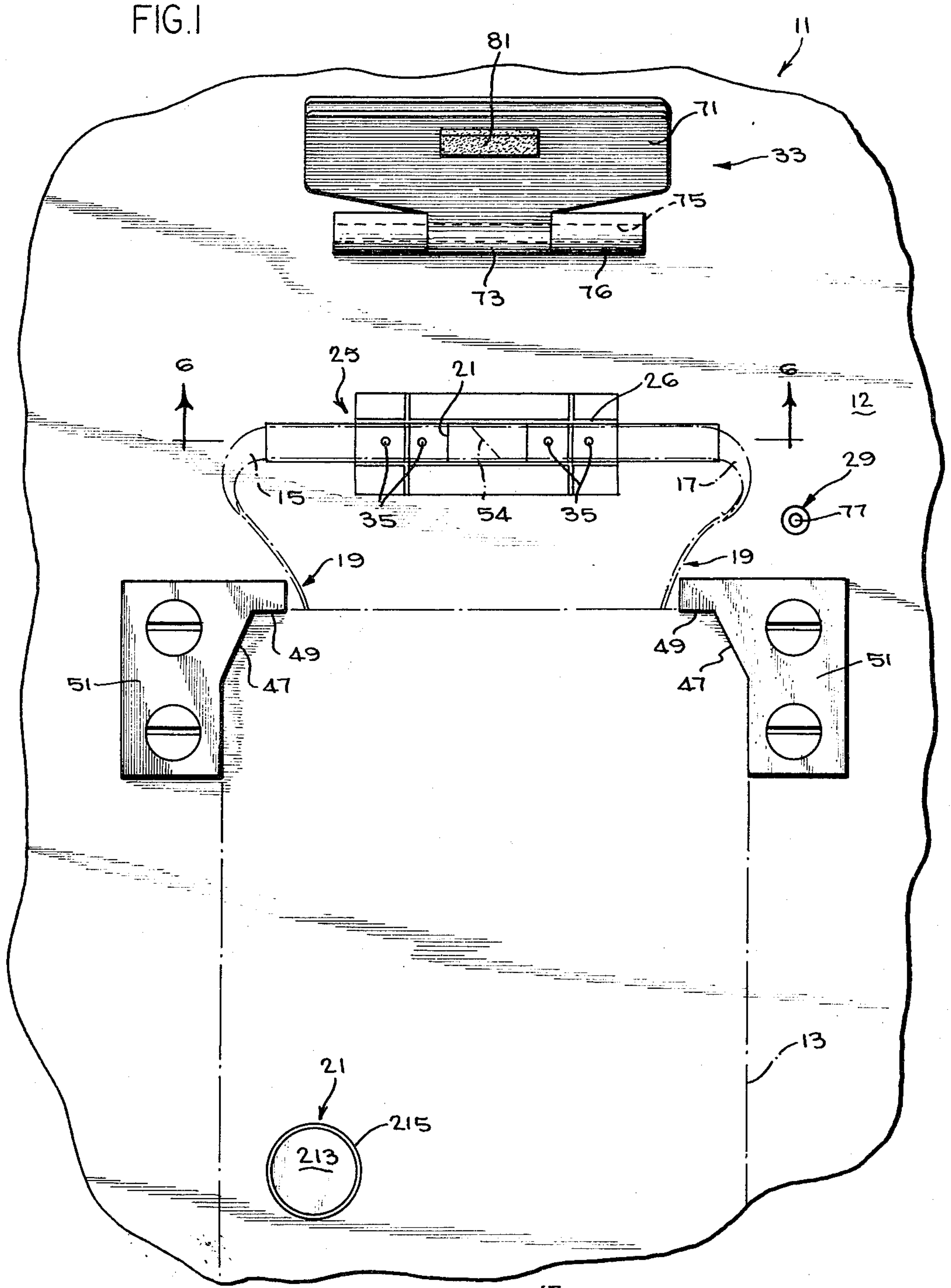
FIG. 1 is a fragmentary, plan view of the apparatus embodying the novel features of the invention.
Figure 4:
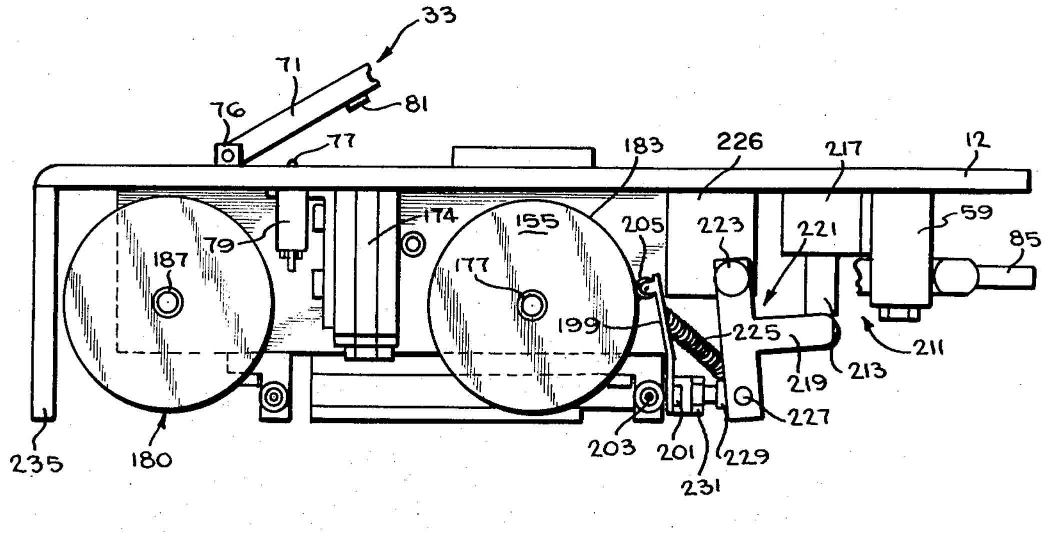
FIGS. 4 and 5 are side elevational views of the apparatus of FIG. 3.

The operator having placed the tape ends 17 and 19 in the slot 26, then swings the backing means 33 over the tape ends which are then clamped thereby against the table against movement during the splicing operation. The preferred backing means is in the form of a swingable trap door 71 pivotally mounted at one end 73 on an elongated axle, as best seen in FIGS. 1 and 4, fastened in blocks 76 fixed to the upper surface of the support 12. The free end of the trap door carries on its underside a resilient compressible pad 81 of compressible foam plastic, rubber or the like for movement to abut the upper sides of the tape ends. The compressible pad 81 provides for a consistently uniform distribution of pressure across the splice 21 so that there is eliminated the need for any subsequent rolling or an additional pressure operation to assure that sufficient pressure was applied to cause the pressure sensitive adhesive to adhere throughout the length of the splice.

Figure 3:
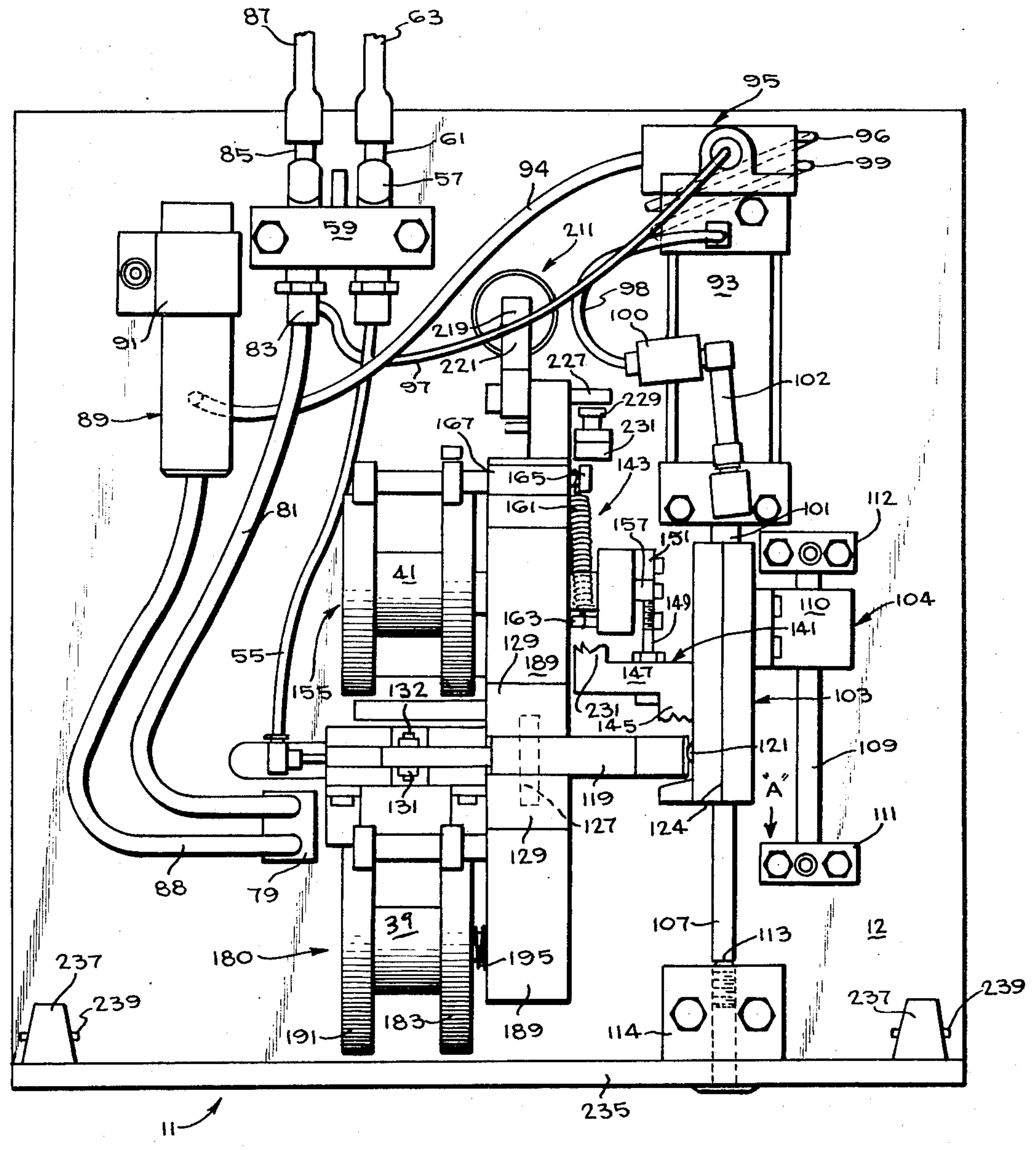
FIG. 3 is a bottom view of the apparatus of FIG. 1.

The switch means 29 for initiating an automatic application of a splice is carried on the upper surface of the support 12; and in this instance, includes a vertically reciprocal plunger 77 which operates a three-way, pneumatic pilot valve 79 which, as best seen in FIG. 3, is secured to the underside of the support 12. This three-way pilot valve 79 is connected by an air line 81 to a T-fitting 83 which is mounted on the mounting block 59 which also holds the vacuum line connector 57. A quick disconnect sleeve 85 couples a main air inlet line 87 to the T-fitting 83. Operation of the pilot valve 79 allows compressed air from the main inlet line 87 and the line 81 to flow therethrough and out through a line 88 to an air impulse relay 89 fixed by a bracket 91 to the under side of the support 12. The air impulse relay 89 serves to control the time and pressure of operation of a main air cylinder 93 in a manner which is independent of the three way pilot valve 79. More specifically, the operator may only momentarily depress the plunger 77 or the operator may depress the plunger 77 for a considerable period; and the result is the same, in that the impulse relay 89 is triggered and causes the operation of the air cylinder to cause the splicing operation, as will be explained in greater detail.

The impulse relay 89 is connected by a line 94 from the bottom thereof to one end of a four-way control valve 95 which is a spool valve attached to one end of the air cylinder 93. An impulse of air from the impulse relay 89 shifts the spool of the control valve 95 to a position wherein compressed air at line pressure from the main air inlet T 83 and an attached line 97 may flow into the valve 95 and therethrough to a line 98. This line 98 is connected through flow control valve 100 and a line 102 to a forward side of the cylinder opposite the four-way valve 95. Thus, compressed air is introduced into the forward end of the air cylinder 93 to cause an internal piston (not shown) to travel toward the rearward end of the cylinder at the valve 95. This movement will retract into the cylinder 93 its piston rod 101 which extends outwardly from the forward end of the cylinder. As will be explained in greater detail, retraction of the piston and piston rod 101 into the cylinder causes air flowing over line 96 to shift the spool of the valve 95 to allow air at line pressure to flow through line 99 to force the piston and piston rod 101 in the forward direction.

In this instance, the flow control valve is adjustable to control the speed of piston travel in the air cylinder 93. The illustrated air cylinder 93 operates on compressed air at 75 to 100 p.s.i. and its internal piston has a 2 inch stroke. The speed of movement of the piston is reduced by the flow control valve in order to reduce the speed of operation of the feed of the splice web 31 as it may tear if pulled too abruptly. As will be explained, the forward movement of the piston and piston rod 101 is not reduced by the flow control valve and proceeds at a faster speed which is desirable for a quick shear of a splice from the splice web.

The air cylinder 93 is a double acting cylinder and its first operation during the retracting of its piston rod 101 is to retract the punch and applicator member 34 and to feed the splice web 31. To these ends, the piston rod 101 is connected to a block shaped, slide actuator 103 which operates the web feeding means and punch and applicator member 34, as will be explained. The slide actuator 103 is guided for straight line rectilinear movement by a rod and block assembly 104 and a keyway guide, the latter including a key formed on the top of the slide actuator 103 and projecting upwardly into and slidable within a keyway groove 107 formed in the support 12. The keyway groove 107 is parallel to the direction of travel of the piston rod 101 of the air cylinder 93. Also, parallel to the keyway groove and to the path of the center line of the air cylinder is a guide rod 109 of the guide rod assembly 104. Movable along the guide rod 109 and fastened to one side of the slide actuator 103 is an angle shaped guide block 110 which has a bore therein through which extends the guide rod 109. The opposite ends of the guide rod 109 are secured in suitable brackets 111 and 112 which are fastened to the underside of the support 12. Thus, the key formed on the top of the slide actuator 103 slides in the keyway slot or groove 107 and the guide block 110 slides along the rod 109 during reciprocation of the piston rod 101 by the air introduced into the air cylinder 93.

The length of the stroke of slide actuator 103 in the forward direction, i.e. in the direction of arrow A in FIG. 3, is controlled by a movable stop 113 in the form of a screw threaded in a block 114. The screw stop 113 may be threaded toward or from the facing end of the slide actuator 103 to control the length of the forward stroke of the latter. By controlling the length of the actuator stroke, the upward movement of the punch and applicator member 34 may be controlled as will be explained hereinafter.

Figure 5:
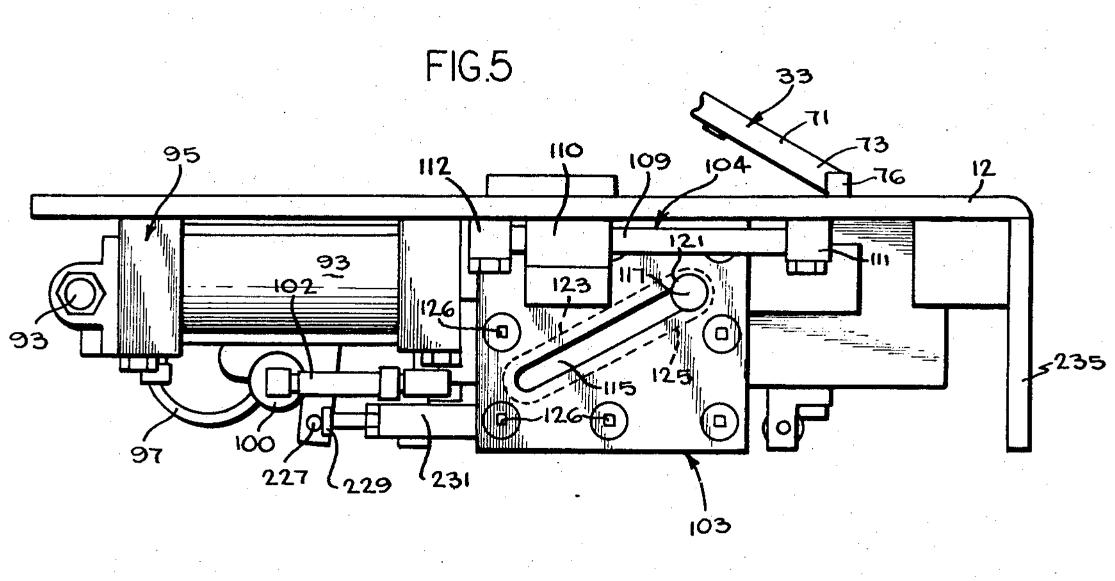

The slide actuator 103 is formed with an inclined cam groove 115 (FIG. 5) within which slides a rotatable ball cam follower 117 which is attached to one end of an actuating lever 119 for the punch and applicator member 34. More specifically, the ball cam follower 117 is rotatably mounted on a rod 121, as best seen in FIGS. 3 and 5, formed on the end of the actuating lever 119. The ball cam follower 117 is captured within the inclined groove 115, the ball being slightly smaller in diameter than the distance between a top wall 123 and a bottom wall 125 of the inclined groove 115. The slide actuator 103 is formed with split, vertical halves which are fastened together at an interface 124 (FIG. 3) by screws 126 with the ball cam follower captured between the halves and in the groove 115. As the slide actuator slides, the ball cam follower is forced to move vertically toward or from the support 12 with the punch actuating lever 119 being pivoted about a horizontally disposed pivot pin 127 (FIG. 3) mounted in brackets 129 fixed to the underside of the support 12. The other end of the punch actuating lever is connected by a pin 132 to a clevis 131 which, in turn, is pinned by a pin 133 to the lower end of the punch and applicator member 34.

During the initial operation of the air cylinder 93, the punch and applicator member 34 is pulled downwardly while slide actuator 103 is moved to cause the ball cam follower 117 to pivot upwardly toward the support 12 with the other end of the lever 119 pulling the punch member 34 down from an upper splice pressing position to a lower inoperative position.

This initial movement of the slide actuator 103 is also used to feed the splice web 31; and to this end, the slide actuator 103 is provided with an actuator feed arm 141 to operate a tape feeding means 143 to index the splice web after the punch and applicator member 34 has retracted through the previously made opening 38 in the web so that the web 31 may move without interference from the punch and applicator member 34. More specifically, the feed arm 141 has a first section 145 which is fastened to a vertical side wall of the slide actuator 103 and a second section 147 which projects outwardly at right angles from the actuator. A screw 149 is threaded through this second section 147 of the feed arm 141 and projects rearwardly toward the feed mechanism 143. The latter includes a one-way clutch 151 which is operatively connected to the take-up spool 155 which carries the take-up roll 41 of the laddered splicing web 31 and backing strip 36.

By threading the screw 149 toward or from the one-way clutch, the amount of turning movement of the spool 155 and clutch 151 may be adjusted to control the increment of feed of the splice web 31. More specifically, the screw 149 may be adjusted toward or from the projecting pin 157 on the one-way clutch 151 so as to strike the same earlier or later during the stroke of the actuator 103. When the screw 149 strikes the pin 157, it displaces the pin causing it to move rearwardly until the slide actuator 103 stops traveling. The projecting pin 157 and clutch 151 are returned to their initial position after a feeding operation by a return spring 161 which has one end fixed to a hanger 163 on a turnable portion of the clutch and its other end fixed to a hanger 165 on a block 167 fixed to the support 12. The return spring extends upwardly about the upper side of the take-up spool support shaft to the hanger 165. Thus, after each operation of the clutch by the feed arm 141, the return spring 161 will return the clutch operating pin 157 through an equal increment to await the next operation thereof.

As best seen in FIGS. 6 and 7, the splice web 31 is pulled through a horizontal slot 168 in the die block 52 with each operation of the tape feed mechanism uncoiling an increment of the splice web 31 from the supply roll 39. The punch and applicator member 34 slides within an intersecting, vertically extending slot 169 which extends the full height of the die block 52. The punch and applicator member 34 and the die block are formed of air hardened tool steel. The dimensions of the rectangular cross-sectional member 34 and the rectangular cross sectioned slot 169 are closely held by grinding and lap finishing to provide a maximum clearance of 0.0001 inch thereby providing a good shear cut when an upper edge 170 of the member 34 lifts the web 31 to engage an upper shearing surface 171 in the die block formed at the upper intersection of the horizontally disposed slot 168 with the vertically disposed slot 169. The block is formed of four pieces including front and rear retainers 172 and 173 in the form of rectangular plates which are spaced from each other by a pair of intermediate inner retainers 174 in the form of rectangular plates. The inner facing surfaces of the inner retainers 174 are spaced from each and define two of the four vertical sides of the vertically extending slot 169. The other two vertical sides of the slot 169 are defined by the portions of the front and rear retainers 172 and 173 extending between the inner retainers. Horizontally extending fasteners 176 extend through the front retainer 172 to the rear retainer 173 and through apertures in the inner retainers 174 to secure the same together. Suitable clearance grooves 177 (FIG. 6) are formed in the bottom central portions of the front and rear retainers 172 and 173 to provide clearance for the clevis 131 and the pins 132, 133 which secure the clevis to the member 34 and to the punch actuating lever 119.

Figure 9:
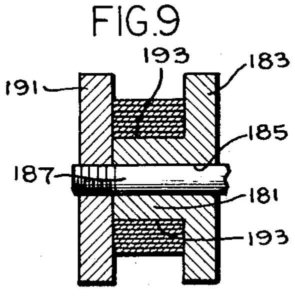
FIG. 9 is a cross-sectional view of a supply spool for a roll of the splicing web.

The preferred take-up spool 155 and supply spool 180 are each constructed, as best seen in FIG. 9, with a cylindrical hub 181 which is integrally attached to a rear flange 183. The hubs 181 each have a horizontal bore 185 through which projects a spool shaft 187 which has a rearward end supported for rotation in a suitable support block 189 fastened to the support 12. A spool locking flange 191 is threaded onto the opposite end of the spool shaft 187. The locking flange may be threaded on the shaft 187 to abut with an adjacent edge of a core 193 which is telescoped on the hub and thereby force the core axially along the hub to abut the back flange 183 whereby the core will be held to turn with the spool. The core 193 of the supply roll 39 is the fiber core supplied with the roll of splice web 31 and backing strip 36 thereon. A similar core 193 from a previously used roll of splice web is placed on the hub of the take-up spool and serves as the core for the "laddered" web and for the backing strip of the take-up roll 41.

Preferably, the payout and take-up spools are provided with tension or drag springs which hold the same against forward or backward movement until there is a positive drive by the one-way clutch mechanism 151. At the take-up spool 180, a circular spring 195 encircles the spool shaft 187 and is compressed between the rear spool flange 183 and the supporting block 189 and exerts a slight frictional drag on the payout spool flange 183 when the latter turns.

As best seen in FIG. 4, the rear flange 183 of the take-up spool 155 is retarded against unwanted movement by a leaf spring 199 which is mounted at its lower end by a fastener 201 to a stud 203 carried by the mounting block 189. On the upper end of the leaf spring is a small roller 205 which rolls on the outer surface of the rear flange 183 of the take-up spool. The leaf spring 199 is bent so that it exerts a biasing force through the roller onto the rear flange to hold the spool against inadvertent or overrunning movement.

The initial threading of the backing strip 36 and splice web 31 is best understood and described in connection with the illustration of FIG. 7. The splice web 31 with the backing strip 36 adhered thereto is threaded through the slot 168 in the die block 52 and then brought over the top of the take-up spool 155 at which position the backing strip 36 is then peeled from the splice web 31 and doubled back into a reverse bend to form a loop 200 illustrated in dotted lines in FIG. 7. The leading end of the backing strip is then again threaded through the die slot 171 and the entire loop is pulled back through the die slot with the backing strip being wound about the top of the supply roll 39, as best seen in FIG. 7, and then moved across rollers 201 and 202 and adhered to the adhesive face of the laddered web 31 which is on the take-up spool 155. After this initial threading, the locking flanges 191 are turned on the shafts 187 of the respective spools to abut the fiber cores and to lock the same thereto. Thus, a subsequent turning of the take-up spool 155 by the one-way clutch pulls a given increment of web and backing strip from the supply roll 39 while an equal increment of laddered web and backing strip are wound on the take-up roll 41.

If desired, each of the cartridges 13 may also be marked at the time of applying the splice 21 by a suitable marking means 211 (FIGS. 3 and 4) which includes an upwardly movable marking plunger 213 which may rise through an opening 215 (FIG. 1) in the support 12 to engage and mark the underside of the cartridge. Preferably, a felt marker having a suitable indicia, such as a number thereon, is attached to the upper end of the marking plunger 213. The plunger is held and guided within a housing 217 fastened to the support 12. The lower end of the marking plunger overlies an arm 219 of an actuating lever 221. The lever 221 is a bellcrank which is pivotally mounted at an upper end on a pivot pin 223 fixed to a mounting block 226 secured to the plate 12. The lower end of the marker actuating lever is biased by a contractile spring 225 to pivot clockwise, as viewed in FIG. 4, to move a pin 227 thereon to a position for engagement by an operator in the form of a screw 229 (FIGS. 4 and 5). The screw 229 is threaded in arm 231 which is integral with the second section 147 of the actuator arm 141 for the feed clutch 151. Thus, when the slide actuator 103 carries the actuator arm 141 rearwardly to feed the splice web 31, the arm abuts the screw 229 against the pin 227 to pivot the marker actuating lever 221 and thereby forces the plunger 213 up through the opening 215 to mark the underside of the cartridge. The mark is preferably at a location which will later be covered by a label.

In the preferred embodiment of the invention, the entire illustrated apparatus 11 is carried on the support 12 which is detachably mounted within an opening in an elongated bench or table (not shown). The illustrated support 12 is in the form of a flat, horizontally disposed metal plate having at one end a downwardly extending flange 235 which carries a pair of quick connect and disconnect fasteners 237 which fit within suitable interlocks on the bench. The fasteners 237 include a turnable interlock member 239 which need only be turned through one quarter of a revolution between its locked and unlocked position with the interlocks on the bench. Thus, to remove a unit for servicing or maintenance, the vacuum line 63 and air line 87 are pulled from the sleeves 61 and 85 and then quick disconnect interlock members 239 are turned one quarter of a revolution. The support 12 may then be pulled from the opening and taken to a service maintenance area. During servicing or maintenance, the unit is usually inverted with the side of the support 12 bearing the trap door 71 facing down and with the supply and takeup spools 155 and 180 and most of the apparatus exposed and facing upwardly for working thereon. The ability to make such quick connections and replacement allows one unit to be removed from a bench on the production line and another unit substituted in its place in a matter of minutes. Thus, the removed unit may be examined and serviced more conveniently and leisurely.

As an aid to understanding the invention, a brief description thereof will now be presented. The operator will take a tape cartridge 13, usually either a four or eight track cartridge, and place it on the support 12 with the forward beveled corners of the cartridge abutting the side and front edges 47 and 49 of the locator guides 51 on the support 12. The top cover of the cartridge is usually open exposing the interior coil of tape and the two opposite ends 15 and 17 of the coiled tape 19 are lifted by the operator and brought forwardly to a slot 26 in the support and tape ends are positioned in the slot to receive the splice on the sides thereof facing downwardly. The beveled ends 15 and 17 of the magnetic tape 19 are then slid toward one another in the slot 26 until they abut each other at juncture line 54. The operator releases the tape ends which are held against shifting or turning by the force of a pressure differential between the atmospheric pressure on the top of the magnetic tape ends and the less than atmospheric pressure at the underside of the magnetic tape ends. The underside of the magnetic tape is in connection with a suitable vacuum pump through the apertures 53 and the punch block 52 and through air hoses 55 which lead to the vacuum line 63.

Next the operator will swing the trap door 71 downwardly to bring the compressible pad 81 against the top surface of the magnetic tape ends 15 and 17 and the operator will then depress the plunger 77 of the switch means to cause an automatic cutting of the splice, transferring of the splice to the underside of the tape ends and pressing of the splice against the tape with sufficient pressure to form the splice. More specifically, the plunger 77 controls a three-way pneumatic switch 79 which interconnects an air inlet line 81 with an air pulse relay 89. That is, compressed air at line pressure flows through the air line 83, the switch 79 and through the air line 88 to pulse the impulse relay 89 which in turn actuates the spool valve 95.

The spool valve 95 is a four-way valve and its spool is shifted by air at line pressure coming through the impulse relay 89 and line 93 from a position allowing flow of air from air line 83 to the forward end of the cylinder 93 to a position at which air may flow through line 83 and four-way valve and out another line 98 which leads to the forward end of the air cylinder 93. The air cylinder is normally at rest with its piston rod 101 extended and with the slide actuator abutted against the screw stop 113. Thus, air flowing through the line 98 and the flow control valve 100 and line 102 to the forward end of the cylinder 93 drives the piston rearwardly retracting the piston rod 101 within the cylinder 93 causing the slide actuator 103 to move towards the air cylinder 93 whereby the cam slot 115 acts on the ball cam follower 117 to pivot the cam follower upwardly while the opposite end of the punch actuating lever 119 is pulling the punch end applicator member 34 downwardly from its upward position, as illustrated in FIG. 6. When the top 170 of the punch member 34 is lowered below the horizontal tape feed slot 168 in the punch block 52, the slide actuator 103 brings its actuating arm 141 to a position to cause actuating screw 149 thereon to operate the feed clutch 151 to turn the take-up spool shaft 187 to pull the splice web 31 forwardly from the supply spool 39 and also simultaneously wind an equal increment of the laddered web and backing strip on the tape-up spool 41. By adjusting the flow control valve the speed of movement of the splice web may be adjusted to prevent tearing of the splicing web 31. Also, the laddered web has sufficient tensile strength to resist tearing if the strips 37 between openings 38 in the web are maintained at a reasonable thickness, e.g. 1/16 to 1/4 inch.

If a mark is to made on the underside of the cartridge 13, the arm 231 on the actuator arm 141 also moves to abut its screw 229 against the pin 227 of the plunger actuating lever 221 to pivot the the lever and cause its actuating arm 219 to force the plunger 213 upwardly in the opening 215 in the support 12 to mark the cartridge.

When the piston rod 101 is retracted, the internal piston (not shown) has compressed air in the cylinder 93 sufficiently so that air over line 96 automatically shifts the spool of the four-way valve 95 to a position at which air then may flow from the air line 81 through line 99 to the rearward side of the air cylinder 93 to reverse the direction of travel of the piston and piston rod 101. As the piston rod 101 protracts, it slides the slide actuator 103 forwardly in the direction of arrow A and its cam slot 115 acts on the cam follower 117 to pivot the adjacent end of the punch lever 119 downwardly whereby the opposite end of the lever pivots about the pin 127 to raise the pin and applicator member 34 to sever the rectangular shaped splice 21. The splice 21 rests on the top 170 of the punch member 34 and is carried upwardly thereby to abut the lower sides of the tape ends 15 and 17. The punch member 34 forces the tape ends upwardly against the compression pad 81 which will deform to allow a generally equalized and uniform pressure over the full area of the splice 21 thereby assuring that the splice will adhere over its entire area to the respective tape ends. The operation of the apparatus is then complete with the splice 21 being severed from web 31 and being automatically applied in a very short period of time in which it takes the piston rod 101 to reciprocate. The period of time required to splice the tape ends is constant and is independent of the time period for which the operator holds the plunger 77 of the switch depressed.

The operator may then lift the trap door backing member 33 and lift the now spliced tape ends whereby the magnetic tape 19 is now endless with an aluminum, metallic splice 21 marking the loop as to when the intelligence thereon begins and ends. The operator then usually spins the coil of tape to wind the splice and tape extending outwardly of the cartridge back toward the coil. The cartridge is then placed on a conveyor to move to a station at which the cover will be permanently attached.

From the foregoing, it may be seen that the present invention provides for the severing of a splice from a splice web and the automatic application thereof to tape ends of tape cartridge. The tape ends are quickly aligned and conveniently held against shifting and means including a backing member assure proper application pressure and adhesion of the splice to the tape ends. The apparatus is automatic and preferably has pneumatic controls rather than electrical controls and is readily installed or detached from its position in a production line for servicing or maintenance.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. An apparatus for splicing ends of a magnetic tape of a tape cartridge with a metallic splice having an adhesive coating thereon for securing together the ends of the magnetic tape to form an endless magnetic tape, said apparatus comprising a support for holding a tape cartridge having the magnetic tape ends to be joined, means including a tape receiving groove on said support for receiving and holding the magnetic tape ends at a predetermined position, backing means for movement into engagement with the upper sides of the magnetic tape ends in said groove to back the same while the splice is pressed upwardly against the lower sides of the tape ends, means for retaining said tape ends in said groove until said backing means is positioned in engagement with said tape ends, switch means to initiate a splicing tape operation, feed means for feeding an elongated splice web from which splices are severed to a severing station, and means including a motor means at said severing station operable by said switch means for severing a splice from said web and for lifting said splice to the undersides aligned ends of the magnetic tape and for pressing the splice thereagainst to form the endless magnetic tape for the cartridge.

2. An apparatus in accordance with claim 1 in which said motor means comprises a fluid operated cylinder controlled by said switch means and in which said cylinder operates said feed means to feed said tape and operate said means at said severing station to sever a splice from said web.

3. An apparatus in accordance with claim 2 in which said switch means is a pneumatic switch and in which pneumatic valve means are operated by said switch means to cause said fluid operated cylinder to operate said feeding and said means for severing and pressing the splice to the magnetic tape ends.

4. An apparatus in accordance with claim 2 in which means are provided to exert a suction force on the tape ends to hold the same in position on said support for receiving a splice.

5. An apparatus in accordance with claim 1 in which said support has an opening therein and in which said means for severing said tape includes a punch movable through said opening in said support to press the splice against the tape ends.

6. An apparatus in accordance with claim 5 in which a removable frame carries said feeding means and said punch for separation from said support and in which quick disconnect means fastens said frame to said support for quick connection and disconnection therefrom.

7. An apparatus in accordance with claim 2 in which means are provided to reduce the speed at which said cylinder operates said feeding means to less than the speed at which said cylinder operates said means to sever a splice.

8. A removable splicing unit for splicing ends of a magnetic tape to provide an endless tape for a tape cartridge at an assembly line work station, said unit comprising an upper flat substantially horizontally disposed support, means on the upper side of said support for holding the cartridge having ends of tape to be spliced, a backing means on the upper side of said support for engaging the upper side of the magnetic tape ends, a supply spool means for supplying to a severing station a web of splicing material having a pressure sensitive adhesive on one side thereof protected by a backing strip, means for feeding said web to said severing station and for separating said backing strip from said adhesive on said web, punch and die means on the underside of said support for severing a splice from said web and for applying said splice to the underside of said tape through an opening in said support, switch means operable to cause a web feeding by said means for feeding and a splice severing, and applying operations by said punch and die means, motor means on said support operable by said switch means to actuate said feeding means and said punch and die means, and releasable securing means associated with said support for releasably securing said support at said assembly line work station.

9. A splicing unit in accordance with claim 8 in which said motor means is an air cylinder, said switch means includes a pneumatic switch, and in which an air impulse relay is operated by said penumatic switch to pulse said air cylinder to operate independently of release of the pneumatic switch by the operator, and in which valve means are provided to reduce the speed of operation of said web feeding by said motor means to prevent tearing of said web.

10. A method of joining ends of a magnetic tape of a magnetic tape cartridge with an adhesive bearing splice comprising the steps of: placing a cartridge on a support adjacent a splicing station, placing the ends of a wound coil of magnetic tape in a tape receiving groove on said support, aligning the ends of the magnetic tape at a given position, positioning a backing means over the aligned tape ends in the groove, operating a switch means to automatically separate a web of splicing material from a protective backing strip to expose a pressure adhesive on one side of said web, feed the web to a severing station, automatically sever a splice from said web of material, automatically transfer said severed splice to said tape ends, and automatically press the adhesive on the splice against the tape ends thereby joining the same.

11. An apparatus for splicing ends of a magnetic tape of a tape cartridge with a metallic splice having an adhesive coating thereon for securing together the ends of the magnetic tape to form an endless magnetic tape, said apparatus comprising a support for holding a tape cartridge having the magnetic tape ends to be joined, means associated with said support for locating the magnetic tape ends at a predetermined position and for backing one side of the magnetic tape ends while the splice is pressed against another one of the sides of the tape ends, switch means to initiate a splicing tape operation, feed means for feeding an elongated web from which splices are severed to a severing station, and means at said severing station operable by said switch means for severing a splice from said web and for pressing said splice to the other side of aligned ends of the magnetic tape to form the endless magnetic tape for the cartridge, said feed means including a supply spool for a roll of the splicing web, said web having a backing strip peelable from the adhesive coating thereon, and a take-up reel for winding the peeled backing strip and the web which is perforated as a result of splices being severed therefrom.

References Cited

UNITED STATES PATENTS

| | | | |
|---|---|---|---|
| 3,162,565 | 12/1964 | Miller et al. | 156—506 |
| 3,582,009 | 6/1971 | Ceroll | 156—506 X |
| 2,645,270 | 7/1953 | Speed et al. | 156—505 X |
| 3,185,608 | 5/1965 | Nagy | 156—506 |
| 2,668,576 | 2/1954 | Nichols | 156—505 |

PHILIP DIER, Primary Examiner

U.S. Cl. X.R.

156—510